(12) United States Patent
Schmitt et al.

(10) Patent No.: US 12,442,560 B2
(45) Date of Patent: Oct. 14, 2025

(54) SYSTEM AND METHOD FOR ENHANCED PROVISION OF HOT WATER

(71) Applicant: INSINKERATOR LLC, Benton Harbor, MI (US)

(72) Inventors: Matthew Schmitt, Kenosha, WI (US); Greg Chesack, Kenosha, WI (US); Don Gapko, Mount Pleasant, WI (US)

(73) Assignee: INSINKERATOR LLC, Benton Harbor, MI (US)

( * ) Notice: Subject to any disclaimer, the term of this patent is extended or adjusted under 35 U.S.C. 154(b) by 0 days.

(21) Appl. No.: 18/615,596

(22) Filed: Mar. 25, 2024

(65) Prior Publication Data
US 2024/0328673 A1   Oct. 3, 2024

Related U.S. Application Data

(60) Provisional application No. 63/455,850, filed on Mar. 30, 2023.

(51) Int. Cl.
*F24H 15/223* (2022.01)
*F24D 19/10* (2006.01)
(Continued)

(52) U.S. Cl.
CPC ....... *F24H 15/223* (2022.01); *F24D 19/1051* (2013.01); *F24H 15/281* (2022.01); *F24H 15/315* (2022.01)

(58) Field of Classification Search
CPC .... F24H 15/223; F24H 15/281; F24H 15/315; F24D 19/1051; Y10T 137/87249
(Continued)

(56) References Cited

U.S. PATENT DOCUMENTS 1,942,270 A * 1/1934 Resek ................. G05D 23/136
236/12.15
2,526,099 A * 10/1950 Vinson ................ G05D 23/136
236/12.2
(Continued)

FOREIGN PATENT DOCUMENTS

GB          2545015 B    12/2015
WO     2003085326 A1    10/2003

OTHER PUBLICATIONS

HydraRester Technical Bulletin for Sioux Chief HydraRester water hammer arrester dated Aug. 2017; Sioux Chief Manufacturing Company (1 page).
(Continued)

*Primary Examiner* — William M McCalister
(74) *Attorney, Agent, or Firm* — Brooks Kushman P.C.

(57) ABSTRACT

Point-of-use water heating systems, systems including such heating systems, and methods of operating such systems are disclosed herein. In an example embodiment, a point-of-use water heating system includes a thermostatic mixing valve and a hot water tank configured to heat a portion of input water received from the mixing valve to become heated water having an elevated temperature. The heating system includes an actuatable valve and a buffering chamber having an outlet configured to provide, at least indirectly, output water having an output temperature less than the elevated temperature. The mixing valve is configured to output mixed water, and buffering chamber is configured to retain a residual portion of the mixed water when the actuatable valve is switched to a closed status. When the actuatable valve is subsequently switched to an open status, an amount of water communicated from the mixing valve undergoes a mixing with the residual portion.

20 Claims, 5 Drawing Sheets

(51) Int. Cl.
*F24H 15/281* (2022.01)
*F24H 15/315* (2022.01)

(58) Field of Classification Search
USPC .......................................................... 137/597
See application file for complete search history.

(56) References Cited

U.S. PATENT DOCUMENTS

| | | | |
|---|---|---|---|
| 2,895,676 A * | 7/1959 | Kraft | F24D 17/00 |
| | | | 236/12.14 |
| 2,905,386 A * | 9/1959 | Rimsha | G05D 23/1393 |
| | | | 236/12.2 |
| 4,249,695 A | 2/1981 | Dreibelbis | |
| 4,685,156 A * | 8/1987 | Brabazon | F16K 1/523 |
| | | | 4/677 |
| 5,339,859 A | 8/1994 | Bowman | |
| 6,059,193 A * | 5/2000 | Braathen | F24H 9/133 |
| | | | 236/12.14 |
| 7,228,874 B2 | 6/2007 | Bolderheij et al. | |
| 7,945,146 B2 | 5/2011 | Cabrera | |
| 9,255,644 B1 * | 2/2016 | Voigt | F16K 15/04 |
| 9,624,655 B2 | 4/2017 | Gregory et al. | |
| 10,191,500 B2 | 1/2019 | Akita et al. | |
| 10,240,816 B2 | 3/2019 | Whitehouse et al. | |
| 2010/0263754 A1 | 10/2010 | Gordon et al. | |
| 2012/0057857 A1 | 3/2012 | Kenney et al. | |
| 2012/0060827 A1 * | 3/2012 | Roetker | F24H 15/345 |
| | | | 126/714 |
| 2018/0306463 A1 | 10/2018 | Yuan | |
| 2021/0318027 A1 * | 10/2021 | Boros | F24H 15/238 |

OTHER PUBLICATIONS

Watts Thermostatic Mixing Valves, Reliable, ASSE-listed valves from a recognized leader in flow-control products brouchure dated 2022 (12 pages).

* cited by examiner

SYSTEM AND METHOD FOR ENHANCED PROVISION OF HOT WATER

CROSS-REFERENCE TO RELATED APPLICATIONS

This application claims the benefit of U.S. provisional application Ser. No. 63/455,850, filed Mar. 30, 2023, the disclosure of which is hereby incorporated in its entirety by reference herein.

FIELD

The present disclosure relates to water heaters and heated water dispensation systems and related methods of operation, and more particularly relates to point-of-use water heaters and heated water dispensation systems and related methods of operation.

BACKGROUND

Heated water can be provided in various manners. In some environments, a faucet or outlet (or other system or device) at which hot water is to be dispensed or utilized is located remotely from a hot water heater or hot water reservoir at which water is heated or heated water is stored. For example, a hot water heater or hot water reservoir may be implemented in a building or facility having multiple faucets or outlets (or other systems or devices) that are distributed at multiple disparate locations within the building or facility, one or more of which are located remotely from the hot water heater or reservoir. Also for example, a hot water heater or hot water reservoir (e.g., a boiler), possibly in part due its size, may be located in a basement or other room or section of a building or facility that is remote from the faucets, outlets, systems, or devices at which hot water is to be dispensed or utilized.

Although such arrangements of hot water heaters or reservoirs relative to faucets or outlets (or other system or devices at which hot water is to be dispensed or utilized) are common and are effective in some environments, such arrangements can be ineffective or disadvantageous in some respects. For example, when faucets or outlets at which hot water is to be dispensed are far from the hot water heaters or reservoirs from which hot water is to be provided, there can be significant delays between the times at which the faucets or outlets are actuated to dispense hot water and the times at which hot water is emitted from those faucets or outlets. This can occur if the faucets or outlets are turned off for periods of time and residual water lingering within any connecting pipes, tubes, or linkages connecting the faucets or outlets with the hot water heaters or reservoirs has cooled off. Also for example, in some environments it is not possible to implement large hot water heaters or reservoirs.

In view of such considerations, point-of-use water heating systems have been developed by which water that is at a lower-than-desired temperature can be heated at locations that are at or proximate to the locations of the faucets or outlets at which the heated water is to be dispensed (or the locations of other system or devices that require such heated water). Such point-of-use water heating systems can include, for example, tankless water heaters as can be employed in relation to bathtubs, in which unheated (e.g., cold) water is provided immediately to a gas heating mechanism in which a gas flame, upon being lit, heats the unheated water to a desired output temperature. However, conventional point-of-use water heating systems are often disadvantageous in one or more respects. For example, some conventional point-of-use water heating systems may be insufficiently compact to be practically situated at or proximate to the faucets or outlets at which hot water is to be dispensed. Also, for example, in the case of the aforementioned tankless water heaters, it may can be impractical or undesirable to install gas lines to those types of mechanisms when positioned at or proximate to the faucets or outlets at which hot water is to be dispensed.

For at least one or more of these reasons, or one or more other reasons, it would therefore be advantageous if improved water heaters or heated water dispensation systems, including improved point-of-use water heaters or heated water dispensation systems, and related methods of operation, and improved methods of operation of such devices and systems, could be developed, so as to address any one or more of the concerns discussed above or to address one or more other concerns or provide one or more benefits.

BRIEF SUMMARY

In at least some example embodiments, the present disclosure relates to a point-of-use water heating system. The system includes a thermostatic mixing valve having first, second, third, and fourth ports, where the first port is configured to receive, at least indirectly, input water having an input water temperature. Also, the system includes a hot water tank having a first inlet and a first outlet, where the first inlet is coupled at least indirectly to the second port of the thermostatic mixing valve, where the first outlet is coupled at least indirectly to the third port of the thermostatic mixing valve, and wherein the hot water tank is configured to heat a portion of the input water received from the thermostatic mixing valve to become heated water having an elevated temperature greater than the input water temperature. Further, the system includes an actuatable valve having a second inlet and a second outlet, where the second inlet is coupled at least indirectly to the fourth port of the thermostatic mixing valve. Also, the system includes a buffering chamber having a third inlet and a third outlet, where the third inlet is coupled at least indirectly to the second outlet of the actuatable valve, and where the third outlet is configured to provide, at least indirectly, output water having a desired output temperature that is greater than the input water temperature and less than the elevated temperature. Additionally, the thermostatic mixing valve is configured to output, at the fourth port, mixed water including both a first portion of the input water and a second portion of the heated water, where the mixed water is communicated by the actuatable valve to be received by the buffering chamber. Further, the buffering chamber is configured to retain a residual portion of the mixed water when the actuatable valve is switched to a closed status so that, when the actuatable valve is subsequently switched to an open status, a further amount of water communicated from the thermostatic mixing valve by the actuatable valve to be received by the buffering chamber undergoes a mixing with the residual portion, whereby, if the further amount of water has a further temperature greater than the desired output temperature due to a reaction time of the thermostatic mixing valve, then due to the mixing a combined water portion within the buffering chamber resulting from the mixing has a combined temperature that is less than the further temperature.

Also, in at least some example embodiments, the present disclosure relates to a method of providing heated water. The method includes receiving input water having an input water temperature at a first port of a thermostatic mixing valve, and communicating a first portion of the input water from a second port of the thermostatic mixing valve to a first inlet of a hot water tank. Additionally, the method includes heating the first portion of the input water within the hot water tank to generate heated water having an elevated temperature that is greater than the input water temperature, and communicating a second portion of the heated water from the hot water tank to a third port of the thermostatic mixing valve. Further, the method includes mixing, at a thermostatic mixing valve, a third portion of the input water having the input water temperature with the second portion of the heated water having the elevated temperature, so as to generate mixed water having a desired output temperature. Also, the method includes receiving a control signal that causes an additional valve at least indirectly coupling a fourth port of the thermostatic mixing valve with a buffering device to have an open status, so that the a fourth portion of the mixed water flows from the thermostatic mixing valve to the buffering device. Further, the method includes outputting the fourth portion of the mixed water having the desired output temperature from the buffering device for receipt by a dispensation device.

Additionally, in at least some further example embodiments, the present disclosure relates to a water dispensation system. The water dispensation system includes a sink system including a sink basin, a faucet, and a sensing device mounted at least indirectly in relation to the sink basin and the faucet, and a point-of-use water heating system positioned adjacent or in proximity to the sink system. The point-of-use water heating system includes a thermostatic mixing valve having first, second, third, and fourth ports, where the first port is configured to receive, at least indirectly, input water having an input water temperature. Also, the point-of-use water heating system includes a hot water tank having a first inlet and a first outlet, where the first inlet is coupled at least indirectly to the second port of the thermostatic mixing valve, and where the first outlet is coupled at least indirectly to the third port of the thermostatic mixing valve so as to allow for heated water to flow from the first outlet to the third port. Further, the point-of-use water heating system includes a solenoid valve having a second inlet and a second outlet, where the second inlet is coupled at least indirectly to the fourth port of the thermostatic mixing valve. Additionally, the point-of-use water heating system includes a buffering chamber having a third inlet and a third outlet, where the third inlet is coupled at least indirectly to the second outlet of the solenoid valve, and where the buffering chamber is configured to provide via the third outlet, at least indirectly, output water having a desired output temperature that is greater than the input water temperature and less than an elevated temperature of the heated water. Further, the water dispensation system includes a plurality of links at least indirectly coupling the point-of-use water heating system with each of the faucet and the sensing device of the sink system, where the third outlet is coupled at least indirectly to the faucet by a first link of the plurality of links so that the output water flows to and is dispensed by the faucet.

BRIEF DESCRIPTION OF THE DRAWINGS

Embodiments of hot water heaters, and related water heating systems and devices, and related methods of operation, are disclosed with reference to the accompanying drawings and are for illustrative purposes only. The systems and methods encompassed herein are not limited in their applications to the details of construction, arrangements of components, or other aspects or features illustrated in the drawings, but rather such systems and methods encompassed herein include other embodiments or are capable of being practiced or carried out in other various ways. Like reference numerals are used to indicate like components. In the drawings.

DETAILED DESCRIPTION

Figure 1:
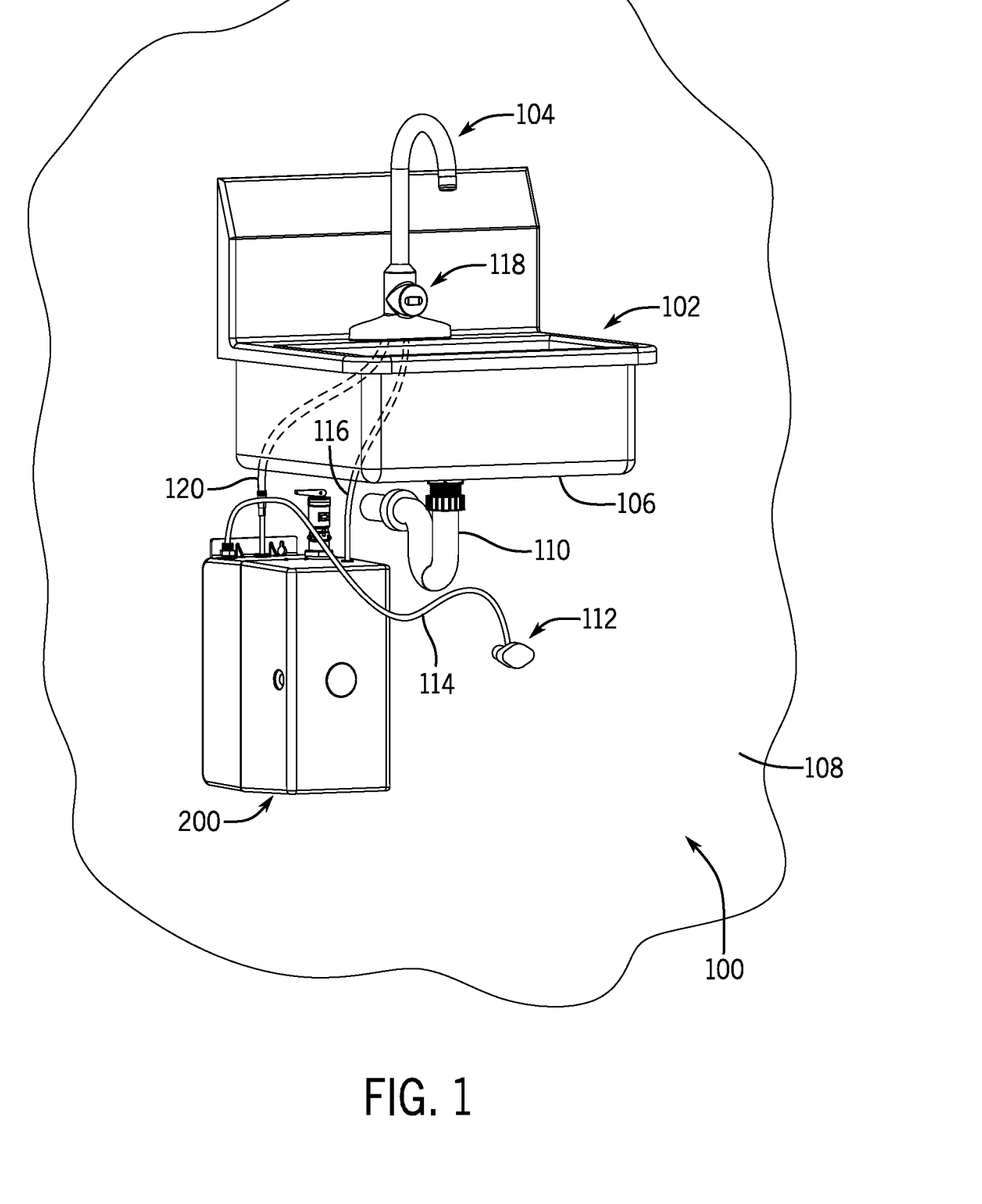
FIG. 1 is a front perspective view of a water dispensation system including a point-of-use water heating system, in accordance with an example embodiment encompassed herein, shown to be mounted to a vertical support structure.

Referring to FIG. 1, a front perspective view of a water dispensation system 100 is provided that includes, in addition to a sink system (or simply sink) 102 including a faucet 104 and a sink basin 106, additionally a point-of-use water heating system (or unit) 200. The sink system (or sink) 102 can be, for example, a kitchen sink, bathroom sink, or other type of sink or sink system suitable for other locations or purposes. In the present embodiment, each of the sink system 102 (and particularly the sink basin 106 thereof) and the point-of-use water heating system 200 are mounted to and supported upon a vertical support structure 108 that in the present embodiment is a wall (shown in cutaway). The point-of-use water heating system 200 particularly is situated generally under the sink system 102, beneath the sink basin 106. Additionally, a drain (not shown) along the bottom of the sink basin 106 is coupled by a pipe 110 of the sink system 102, to a location on the vertical support structure 108.

The point-of-use water heating system 200 is coupled to a dispensation terminal (or tap) 112 by a first hose 114 (which can be a braided hose). In the present example, the dispensation terminal 112 also is mounted to and supported upon the vertical support structure 108 beneath the sink basin 106. Depending upon a setting of the water dispensation terminal 112, such as the rotational position of a rotatable handle on that dispensation terminal, cold (or unheated) water arriving from a water source (not shown) can be output by the water dispensation terminal and communicated via the first hose 114 from the water dispensation terminal to the point-of-use water heating system 200.

The point-of-use water heating system 200 can be considered a "point-of-use" water heating system in that it is located physically at or proximate to the location (or to the location of the device or system) at which the water heated by the point-of-use water heating system is to be dispensed or utilized. In this example of FIG. 1, the point-of-use water heating system 200 is at or proximate to the location of the faucet 104 as shown, but in other circumstances or embodiments the point-of-use water heating system can be fully integrated as a single structure or mechanism with the device or system at which water is to be dispensed or utilized. Also, in other circumstances or embodiments, a water heating system can be considered a "point-of-use" water heating system if the system is within a particular distance, such as within one, two, or five feet, of the location (or the location of the device or system) at which the heated water is to be dispensed or utilized, or within a particular geographical region (e.g., within the same room of a building) in which the heated water is to be dispensed or utilized.

The point-of-use water heating system 200 operates to heat the cold (or unheated) water received via the first hose 114 and deliver heated water by way of a second hose 116 to the faucet 104. In the present embodiment, the dispensation or emission of heated water out of the faucet 104 is controlled (at least in part) based upon whether an infrared sensor 118 of the faucet determines that a user's hand (not shown) or other object is positioned in front of or near the infrared sensor indicating that heater water output is desired. The infrared sensor 118 is coupled to the point-of-use water heating system 200 by an electrical connector (e.g., a wire) 120, by which a control signal generated by the infrared sensor is communicated to the point-of-use water heating system 200. If the control signal from the infrared sensor 118 communicated via the electrical connector 120 indicates that heated water output is desired, then the point-of-use water heating system 200 will output heated water via the second hose 116 for receipt and dispensation by the faucet 104.

Figure 2:
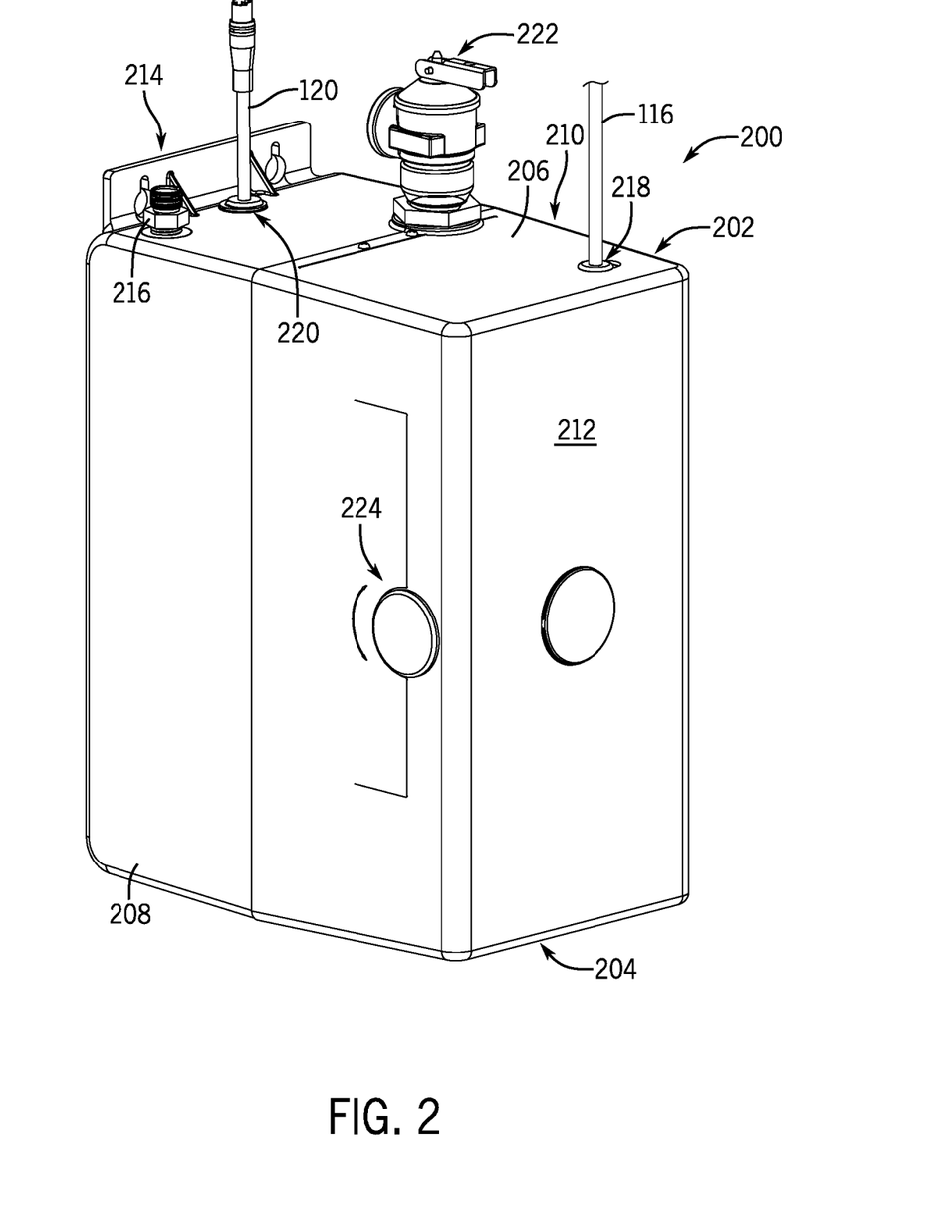
FIG. 2 is a front perspective view of the point-of-use water heating system of FIG. 1.

Referring to FIG. 2, an additional front perspective view is provided of the point-of-use water heating system 200. FIG. 2, in contrast to FIG. 1, omits the vertical support structure 108 and the sink system 102 so as to highlight the features of the point-of-use water heating system 200. Also, the additional front perspective view of FIG. 2 particularly illustrates an exterior of the point-of-use water heating system 200, with internal components of the point-of-use water heating system being shown in further detail in FIG. 3, FIG. 4, and FIG. 5. As shown in FIG. 2, the point-of-use water heating system 200 in the present embodiment includes a housing 202 that is substantially rectangular in shape (e.g., a rectangular cuboid having three pairs of rectangular sides), where the height of the housing is substantially greater than each of its width and depth. That is, a height of the housing 202 between a bottom surface 204 and a top surface 206 is substantially greater than a width of the housing between a left side surface 208 and a right side surface 210, and also substantially greater than a depth of the housing between a front side surface 212 and a rear side surface 214, which would typically be the surface that is in contact with or faces a support surface of the vertical support structure 108 (see FIG. 1).

Several features of the point-of-use water heating system 200 are visible from the exterior view provided in FIG. 2. In particular, along the top surface 206 proximate each of the rear side surface 214 and the left side surface 208 is an inlet terminal 216 to which the first hose 114 can be coupled and at which the point-of-use water heating system 200 can thereby receive cold (or unheated) water. Further along the top surface 206 proximate each of the front side surface 212 and the right side surface 210 is an outlet terminal 218 from which the second hose 116 (shown in cutaway) can extend, so as to be coupled to the faucet 104 and by which the point-of-use water heating system 200 can output heated water for receipt by the faucet. Additionally along the top surface 206 proximate the rear side surface 214, substantially located midway between the right side surface 210 and the left side surface 208, is a power terminal 220 from which the electrical connector 120 (shown in cutaway) can extend, so as to be coupled to the faucet 104 and particularly the infrared sensor 118 thereof.

In addition, the point-of-use water heating system 200 further includes a temperature and pressure relief valve (or "T&P" valve) 222 extending from the top surface 206 of the point-of-use water heating system 200. As described in further detail below, the T&P valve 222 is coupled to a hot water tank 302 (see FIG. 3) within the point-of-use water heating system 200 and configured so that, although the T&P valve is normally closed, the T&P will open if the pressure within the hot water tank and communicated to the T&P valve increases to 150 psi or higher, or if the temperature within the hot water tank and experienced by the T&P valve increases to 200 F or higher. Further, the point-of-use water heating system 200 includes a rotatable dial (or knob) 224 positioned along the left side surface 208 by which a user, by rotating the rotatable dial, can adjust the temperature of the heated water output via the second hose 116.

It should be noted that, in the present example embodiment, the second hose 116 and the electrical connector 120 can be considered to be parts of the point-of-use water heating system 200 and the first hose 114 can be considered to be distinct from the point-of-use water heating system (albeit part of the water dispensation system 100). Nevertheless, in other embodiments, the second hose 116 and/or the electrical connector 120 can be considered to be distinct from the point-of-use water heating system 200 (albeit still part of the water dispensation system 100) and/or the first hose 114 can be considered to be part of the point-of-use water heating system. Further, although in the present embodiment the point-of-use water heating system 200 has a rectangular shape as shown in FIG. 2, the present disclosure also encompasses point-of-use water heating systems having other exterior shapes. Also, although FIG. 2 shows one example arrangement of the inlet terminal 216, the outlet terminal 218, the power terminal 220, the T&P valve 222, and the rotatable dial 224 at various locations on the housing 202, the present disclosure also encompasses other embodiments with other arrangements of one or more of these components.

Figure 3:
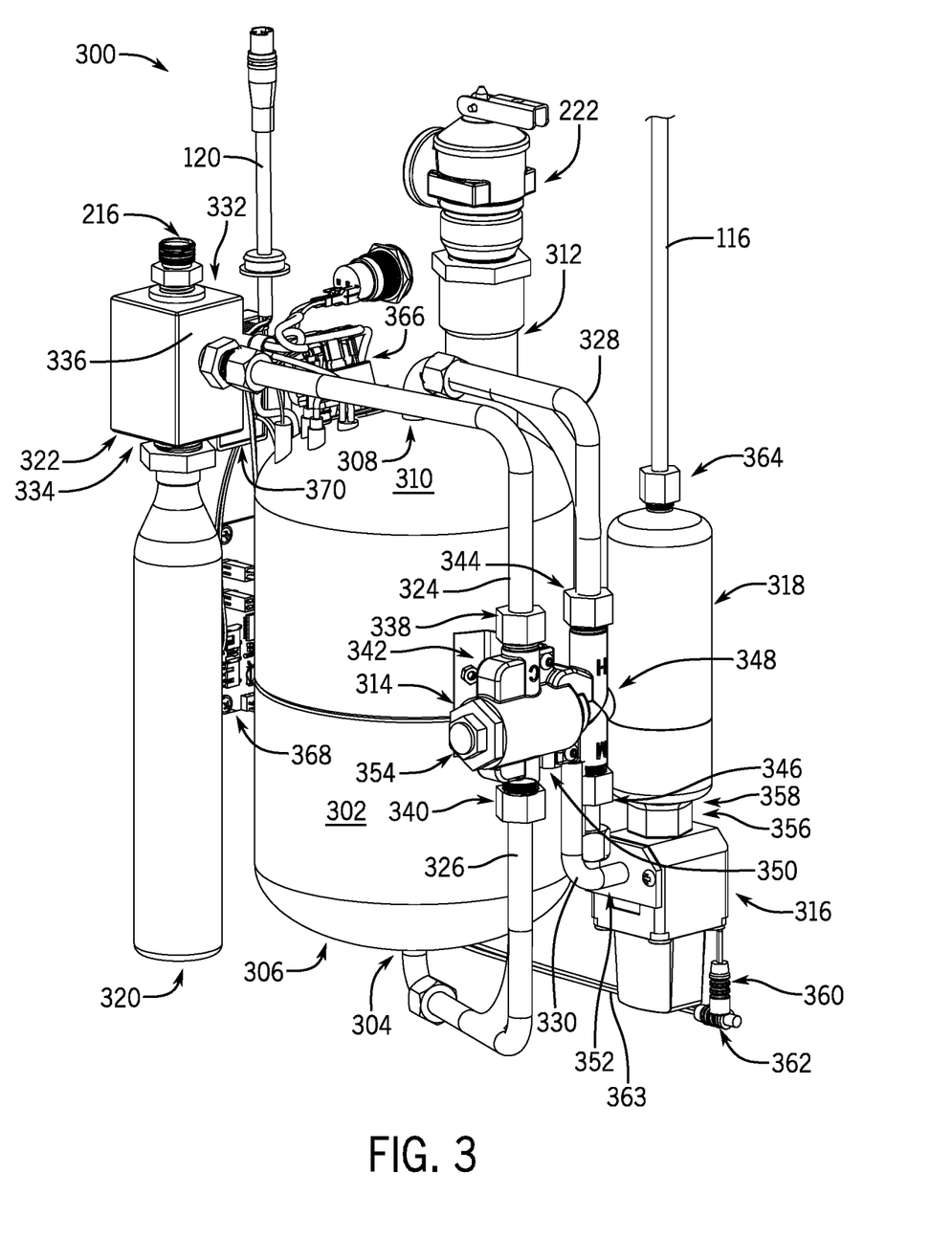
FIG. 3 and FIG. 4, respectively, are front and rear perspective views, respectively, of internal components of the point-of-use water heating system of FIG. 1 and FIG. 2.
Figure 4:
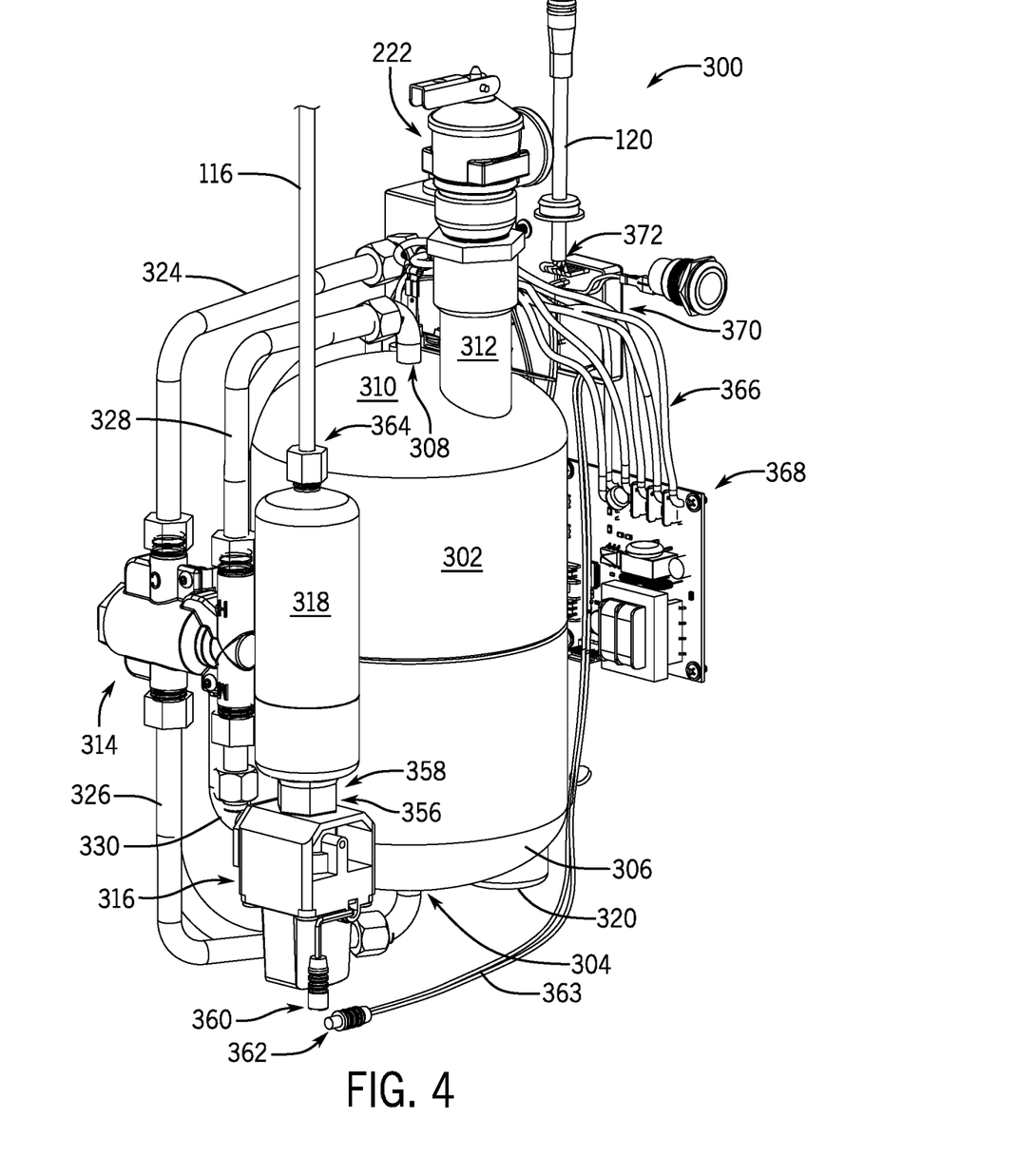

Turning to FIG. 3 and FIG. 4, respectively, a front perspective view and a rear perspective view are provided, respectively, of internal components 300 of the point-of-use water heating system 200. As shown, the internal components 300 include the hot water tank 302 having an inlet 304 along a bottom surface 306 and an outlet 308 along a top surface 310. Further, the hot water tank 302 also includes a channel 312 extending from the top surface 310 up to the T&P valve 222. Further, the internal components 300 include a thermostatic mixing valve 314, a solenoid valve 316, a mixing and/or buffer (mixing/buffer) chamber 318, a water hammer arrestor 320, a fitting 322, and first, second, third, and fourth conduits 324, 326, 328, and 330 that interconnect these components. The mixing/buffer chamber 318 can also be referred to as a mixing/buffer tube or mixing/buffer tank within which is positioned a chamber for holding water.

It should be appreciated that, although the internal components 300 are predominantly components that are positioned within the housing 202 of the point-of-use water heating system 200 when the point-of-use water heating system is fully assembled, the internal components in FIG. 3 and FIG. 4 are also shown to include the inlet terminal 216, the outlet terminal 218, the power terminal 220, and the T&P valve 222 that are shown to be arranged the exterior of the housing 202 in FIG. 2. Also, more particularly, the inlet terminal 216 is formed along a top surface 332 of the fitting 322, and the water hammer arrestor 320 is coupled to a bottom surface 334 of the fitting 322. Further, the first conduit 324 extends from a side surface 336 of the fitting 322 and couples the fitting with the thermostatic mixing valve 314.

More particularly as shown, the thermostatic mixing valve 314 is a H-shaped structure having a first upper port 338 that is coupled to a first lower port 340 at a first junction 342, a second upper port 344 that is coupled to a second lower port 346 at a second junction 348, and a bridge section 350 that connects the first junction 342 and the second junction 348. The thermostatic mixing valve 314 for example can be a Series LFUSG-B Lead Free Under Sink Guardian® Thermostatic Mixing Valve available from Watts of North Andover, Massachusetts. In the present arrangement the first conduit 324 particularly extends from the side surface 336 of the fitting 322 to the first upper port 338 and, by virtue of this arrangement, cold water received at the inlet terminal 216 is communicated to the first upper port of the thermostatic mixing valve 314. Additionally, the second conduit 326 extends from the first lower port 340 to the inlet 304, so that portions of the cold water that are output at the first lower port are provided to the inlet 304 of the hot water tank 302.

Further, it will be appreciated from each of FIG. 3 and FIG. 4 that the third conduit 328 extends from the outlet 308 of the hot water tank 302 to the second upper port 344 of the thermostatic mixing valve 314. Thus, when hot water is output from the outlet 308 of the hot water tank 302, as can happen (for example) when cold water enters the inlet 304 of the hot water tank, that hot water flows into the second upper port 344 of the thermostatic mixing valve 314. Additionally as shown, the fourth conduit 330 extends from the second lower port 346 to a side inlet 352 of the solenoid valve 316. The water flowing out of the second lower port 346 to the solenoid valve 316 is often mixed water that is a combination of (a) first portions of the cold water that are received at the first upper port 338 and pass through the bridge section 350 to the second lower port, and (b) second portions of the hot water that are received at the second upper port 344 of the thermostatic mixing valve and pass through the second junction 348 to the second lower port 346.

It should be appreciated that the particular proportions of the first portions of the cold water and second hot water that together form the mixed water flowing out of the second lower port 346 is dependent upon the thermostatic (thermostat-based) operation of the thermostatic mixing valve 314. The thermostatic operation of the thermostatic mixing valve 314 can be set or determined in the present embodiment by a user by adjusting an adjustment knob (or other rotatable or otherwise adjustable feature) 354 provided adjacent to the first junction 342. Also, although typically during operation the water output by the thermostatic mixing valve 314 at the second lower port 346 is mixed water combining first portions of cold water with second portions of hot water, in some circumstances the water output at the second lower port will comprise only portions of the cold water received at the first upper port 338 or only portions of the hot water received at the second upper port 344.

The solenoid valve 316 governs whether the water received at the side inlet 352 is communicated out of an outlet 356 of the solenoid valve to a bottom end inlet 358 of the mixing/buffer chamber 318, which extends upward from the bottom end inlet to a top end outlet 364 of the mixing/buffer chamber. In the present example embodiment, the solenoid valve 316 includes a solenoid valve electrical coupler 360 that is configured to be coupled to a complementary electrical coupler 362 provided at a first end of an electrical connector 363, a second end of which is coupled to a faucet control (or faucet control device or controller) 370. Accordingly, when the solenoid valve electrical coupler 360 is coupled to the complementary electrical coupler 362, the solenoid valve 316 is electrically coupled to the faucet control 370 by the electrical connector 363. Further as shown, the point-of-use water heating system 200 also includes electrical wires 366 and a circuit board 368. Due to connections provided by the electrical wires 366, the circuit board 368 is coupled to and provides power to the faucet control 370, and also is coupled to one or more other components such that the circuit board can serve other control and monitoring purposes including, for example, controlling heating operation of the hot water tank 302. Additionally as shown, a first end 372 (see FIG. 4) of the electrical connector 120 is also connected to the faucet control 370, with a second end of the electrical connector 120 being (directly or indirectly) linked to the infrared sensor 118 (e.g., as shown in FIG. 1). Thus, the solenoid valve 316 not only is coupled to the faucet control 370 by the electrical connector 363, but also is coupled indirectly to the infrared sensor 118 by the electrical connector 120, faucet control 370, and electrical connector 363.

In the present embodiment, the solenoid valve 316 is actuated by an electrical signal that is received from, or at least indirectly based upon an electrical signal provided by, the infrared sensor 118. More particularly, when the infrared sensor 118 senses that a user's hand (or other object) is positioned proximate to or in front of the infrared sensor, then it provides an electrical signal for receipt by the faucet control 370, which then sends a signal to the solenoid valve 316, which causes the solenoid valve 316 to open and communicate the water received from the thermostatic mixing valve 314 into the bottom end inlet 358 of the mixing/buffer chamber 318. However, when the infrared sensor 118 does not sense any user's hand (or other object) as being proximate to or in front of the infrared sensor, then it ceases providing the electrical signal for receipt by the faucet control 370, which then ceases providing the electrical signal to the solenoid valve 316 (or changes the electrical signal being provided for receipt by the solenoid valve). Consequently, in that circumstance, the solenoid valve 316 closes and the water received by the solenoid valve from the thermostatic mixing valve 314 is no longer provided to the bottom end inlet 358 of the mixing/buffer chamber 318.

Figure 5:
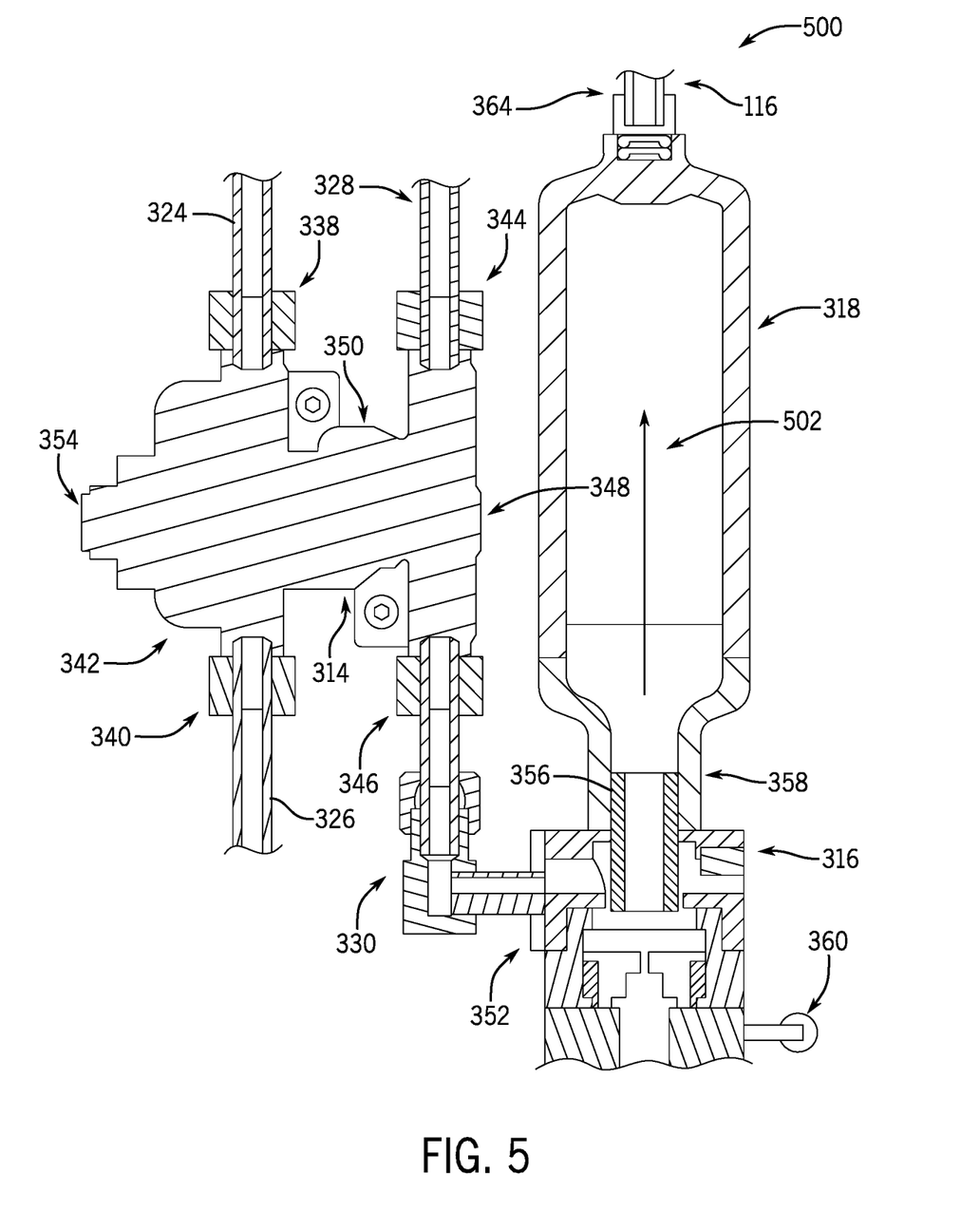
FIG. 5 is a cross-sectional, partly cutaway view of portions of some of the internal components of the point-of-use water heating system that are shown in FIG. 3 and FIG. 4.

Referring additionally to FIG. 5, a cross-sectional, partly cutaway view 500 is provided of portions of some of the internal components 300 of the point-of-use water heating system 200 that are shown in FIG. 3 and FIG. 4. More particularly, FIG. 5 shows the thermostatic mixing valve 314, the solenoid valve 316, the mixing/buffer chamber 318, and the first, second, third, and fourth conduits 324, 326, 328, and 330, respectively—with the solenoid valve 316, top end outlet 364 of the mixing/buffer chamber 318, and first, second, and third conduits 324, 326, and 328 being shown in cutaway (and with the cross-section being generally taken along midplanes of the thermostatic mixing valve and solenoid valve and along central axes of the mixing/buffer chamber and first, second, third and fourth conduits). FIG. 5 illustrates that, when the solenoid valve 316 is open, water received from the thermostatic mixing valve 314 not only flows from the outlet 356 of the solenoid valve 316 into the bottom end inlet 358 of the mixing/buffer chamber 318, but also flows toward the top end outlet 364 of the mixing/buffer chamber as the mixing/buffer chamber progressively fills with water, as represented by an arrow 502.

Eventually, as the mixing/buffer chamber 318 becomes fully filled with water, water exits the mixing/buffer chamber via the top end outlet 364 and proceeds to flow through the second hose 116 to and out of the faucet 104 (see FIG. 1).

In the present embodiment, the mixing/buffer chamber 318 complements the remainder of the point-of-use water heating system 200 by serving as a water temperature spike suppressor. It should be recognized that, in order to provide significant amounts of hot water at a desired output temperature to the faucet 104 on short notice, the point-of-use water heating system 200 typically operates by heating water in the hot water tank 302 to an elevated temperature (e.g., 116 degrees Fahrenheit or more) that is higher than the desired output temperature (e.g., 105 degrees Fahrenheit or 40 degrees Celsius) and then combining the water from the hot water tank with cold water at the thermostatic mixing valve 314. Given the combining of the water from the hot water tank 302 received at the thermostatic mixing valve 314 via the third conduit 328 with the cold water received at the thermostatic mixing valve via the first conduit 324, the water output by the thermostatic mixing valve via the fourth conduit 330 to the solenoid valve 316 is mixed water having the desired output temperature that is less than the elevated temperature of the water from the hot water tank (and greater than the temperature of the cold water from the first conduit).

The above-described manner of operation is particularly advantageous in that it enables the point-of-use water heating system 200 to generate significant quantities of hot water to be provided to and dispensed by the faucet 104 during steady state operation, even though the point-of-use water heating system (and particularly the hot water tank 302 therein) is compact. Indeed, due to the combining of the water from the hot water tank 302 with the cold water at the thermostatic mixing valve 314, a first volume of water at the elevated temperature that is output by the hot water tank 302 can be transformed into a significantly-larger second volume of mixed water having the desired output temperature that can in turn be provided to the fourth conduit 330, solenoid valve 316, mixing/buffer chamber 318, second hose 116, and faucet 104 for dispensation.

Nevertheless, operation of the thermostatic mixing valve 314 is not necessarily instantaneous in all circumstances, in terms of outputting mixed water at the second lower port 346 (for communication by the fourth conduit 330) having the desired output temperature rather than a higher temperature such as the elevated temperature of the water provided by the hot water tank 302. To the contrary, in some circumstances, it is possible that the thermostatic mixing valve 314 will output at the second lower port 346 merely the water received at the second upper port 344 from the hot water tank 302, at the elevated temperature. This can occur, for example, at times when the solenoid valve 316 is first switched on following periods of time at which the solenoid valve has been switched off an no water flow to the faucet 104 has been occurring (e.g., due to a reaction time of the thermostatic mixing valve). Given such considerations, in the absence of other feature(s) designed to reduce the temperature of the water output from the thermostatic mixing valve 314, it is possible that the water routed to and dispensed by the faucet 104 could have temperatures that were at or close to the elevated temperature of the water provided by the hot water tank 302, which could be undesirably hot for some users or circumstances.

In view of such considerations, in the present embodiment, the mixing/buffer chamber 318 additionally is provided in between the solenoid valve 316 and the second hose 116 leading to the faucet 104, and serves to prevent or reduce the extent to which water that is undesirably hot is provided by the point-of-use water heating system 200 for receipt and dispensation by the faucet. Whenever the flow of water from the point-of-use water heating system 200 is switched from on to off, due to the solenoid valve 316 being switched from being open to being closed, a residual amount of water remains within the mixing/buffer chamber 318. Assuming that the water flowing through the mixing/buffer chamber 318 is at the desired output temperature when the water flow is shut off (e.g., because the flow of water has been occurring continuously for some period of time), then the residual amount of water remaining within the mixing/buffer chamber 318 is at the desired output temperature when the water flow is shut off. Further, so long as the flow of water remains shut off, the residual amount of water within the mixing/buffer chamber 318 either remains at the desired output temperature or decreases to temperatures that are less than the desired output temperature.

Additionally, when the flow of water is started again due to the solenoid valve 316 being opened, water that is newly received at the mixing/buffer chamber 318 from the thermostatic mixing valve 314 via the fourth conduit 330 and solenoid valve 316 is mixed with the residual water within the mixing/buffer chamber. Initially when this occurs, if water is caused to flow out of the mixing/buffer chamber 318 via the top end outlet 364, that water has the temperature of the residual water that is either at or below the desired output temperature for water to be dispensed by the faucet. Further, as time passes and water continues to be caused to flow out of the mixing/buffer chamber 318, for a period of time that water exiting the mixing/buffer chamber still will have a temperature that is equal to, or close to, the temperature that the residual water within the mixing/buffer chamber had before the water flow being restarted.

Consequently even if the water provided from the thermostatic mixing valve 314 for receipt by the solenoid valve 316 has the elevated temperature of the water within the hot water tank 302 when the solenoid valve 316 is switched on and flow is restarted, the initial spike of hot water enters the mixing/buffer chamber full of cooler water that absorbs the temperature spike. To the extent that water is output via the top end outlet 364 of the mixing/buffer chamber 318 at this time, when the solenoid valve 316 is switched on and flow is restarted, the water that is output at the top end outlet 364 will have a lesser temperature that is equal to or substantially closer to the desired output temperature. Then as time passes, the water provided from the thermostatic mixing valve 314 for receipt by the solenoid valve 316 will take on the desired output temperature and so the water provided to, and ultimately output from the top end outlet 364 of, the mixing/buffer chamber 318 will have the desired output temperature.

It should be recognized that the mixing/buffer chamber 318 will take on different sizes depending upon the embodiment and various operational factors. For example, different-sized mixing/buffer chambers can be appropriate for implementation in different point-of-use water heating systems that are configured to provide or communicate different flow rates of water. Although in one example embodiment, the mixing/buffer chamber 318 can be optimized to buffer at a flow rate of 0.5 to 1.0 gallons per minute and can absorb the heat associated with water flow occurring during a time period of about 1 second to 2 seconds during which water received from the thermostatic mixing valve 314 experiences a temperature spike, other embodiments of mixing/ buffer chambers can be optimized or configured for different operational circumstances or anticipated temperature spikes.

In view of the above discussion, it should be appreciated that one or more embodiments encompassed herein can be advantageous in any one or more respects. For example, at least some embodiments of point-of-use water heating systems encompassed herein can be compact by comparison with, or have a smaller footprint than, conventional point-of-use water heating systems (or other water heating systems). Indeed, at least some embodiments of point-of-use water heating systems encompassed herein constitute compact, high power density point-of-use water heating systems. Also, at least some embodiments encompassed herein, the point-of-use water heating system is advantageous in that the system combines, within a single package or housing (or essentially a single package or housing), a source of heated water having a desired temperature, in which there is automatic water temperature regulation, and which is capable of generating the heated water even when supplied only with water from a single unheated (or cold) water line. In at least some such embodiments, the point-of-use water heating systems are able to accept water having a wide range of incoming water temperatures, including near-freezing water, from the single unheated (or cold) water line.

Further, at least some embodiments of point-of-use water heating systems encompassed herein are advantageous in that, by providing thermal energy storage (including, in some cases, thermal energy storage in which heated water is stored at elevated temperatures above desired output temperatures), the systems are capable of delivering water at desired output temperatures (e.g., optimal hand-washing temperatures) for prolonged durations. In at least some such embodiments, such a point-of-use water heating system can provide water at a desired output temperature for a prolonged duration followed by a recovery period, notwithstanding that the system has a small physical footprint and is supplied only with water from a single unheated (or cold) water line. Also, in at least some such embodiments encompassed herein, the point-of-use water heating systems are advantageously designed to extend the availability of output water within a desired, regulated temperature range, while achieving high power-over-footprint ratios utilizing thermal energy storage.

Further, in at least some embodiments encompassed herein, the point-of-use water heating systems are advantageously designed to accommodate a wide range of incoming electric power, desired water flow rates, and incoming water flow temperatures, while delivering elevated power-over-footprint ratios by way of thermal energy storage. Indeed, at least some embodiments of point-of-use water heating systems encompassed herein are able to deliver and output (at least temporarily) heated water at desired output temperatures (based on energy conversation principles) in a manner that is not possible for at least some conventional inline water heating systems, given the same incoming electrical power, incoming water temperature, and desired water flow rate.

Additionally, in at least some embodiments encompassed herein, the point-of-use water heating systems are capable of outputting heated water that is optimal for hand washing, having a temperature (for example) that is at or near 40 degrees Celsius (or 105 degrees Fahrenheit), as is suitable for achieving optimal soap (cleansing) efficiency, oil and/or grease softening, and user comfort. Also, in at least some embodiments, the point-of-use water heating systems, and particularly the hot water tanks (e.g., the hot water tank 302) thereof, are advantageously configured to generate heated water that is stored within the hot water tanks at elevated temperatures such as 116 degrees Fahrenheit, which helps to prevent or reduce the growth of various type of bacteria (e.g., legionella bacteria) within the system. This is possible for example when the elevated temperatures are higher than the maximum temperatures at which such bacteria can survive.

The advantageous operational capabilities of at least some embodiments of the point-of-use water heating systems encompassed herein can be understood in part with an example demonstrating how a point-of-use water heating system encompassed herein can achieve a significantly higher power-over-footprint (P/F) ratio than that which can be achieved by an example conventional system. In this regard, the P/F ratio can be calculated for the point-of-use water heating system 200 in accordance with Equation (1):

$$P/F = Q\_dot * t\_c/(t\_c + t\_r)/F \qquad (1)$$

where t_c is the maximum duration of continuous operation, t_r is a recovery time before a new cycle of operation (and the total cycle time being tau), F is the total footprint of the point-of-use water heating system (including controls), and Q_dot is the delivered power, which in turn can be calculated in accordance with Equation (2):

$$Q\_dot = m\_dot * c * \Delta T \qquad (2)$$

where m_dot is the volumetric flow rate of incoming water (e.g., in gallons per second, or g/s), c is the specific heat capacity of water (c=4.186 Joules per gram° C.), and ΔT is the output water temperature from the system minus the temperature of the incoming (e.g., cold) water to the system.

Given the above Equations (1) and (2) pertaining to calculating the P/F ratio, it can be seen that at least one example embodiment encompassed herein will achieve a P/F ratio that significantly higher than the P/F ratios for a conventional system. For example, suppose that the point-of-use water heating system 200 encompassed herein receives incoming unheated (cold) water having a temperature of 0 degrees Fahrenheit, an incoming water flow rate of 0.5 gallons per minute (gpm), and incoming power availability of (or up to) power corresponding to 120 Volts (V) and 15 Amperes (A). Also, further suppose that t_c=4*60 seconds, t_r=2*60 seconds (thus, tau=360 seconds, which is the combination of a period in which the solenoid valve is open for 240 seconds and then closed for 120 seconds), m_dot=32 g/s, c=4.186 J/g/(degree Celsius), ΔT=40 degrees Celsius (given that the incoming water temperature is 0 degrees Celsius and the desired output temperature is 40 degrees Celsius), and F=3000 cm³. With these assumptions that P/F ratio for the point-of-use water heating system will be 1.2 W/cm³. By comparison, a conventional water heating system (e.g., a boiler or other conventional water heater) may have a P/F ratio of 0.46 W/cm³. Thus, in one example embodiment, the point-of-use water heating system 200 can have a P/F ratio that is about 160% higher than the P/F ratio for a conventional system.

In addition, at least some embodiments encompassed herein achieve one or more further advantages. At least some embodiments encompassed herein include a mixing/buffer chamber, such as the mixing/buffer chamber 318, which serves to prevent or reduce the likelihood that water at an elevated temperature above the desired output temperature is dispensed from the faucet, which could be uncomfortable for a user. In particular, such a mixing/buffer chamber operates to prevent or reduce the dispensation of elevated temperature water even if the thermostatic mixing valve allows for a momentary spike of hot water to be released at activation (e.g., when the solenoid valve is opened to allow for water flow therethrough) before the thermostatic mixing valve adjusts to the desired output (set) temperature. Due to the mixing/buffer chamber being placed at the outlet of the solenoid valve and holding a small volume of water, that small volume of water mixes with the elevated temperature water and brings that water down to a comfortable temperature (e.g., for handwashing). The mixing/buffer chamber can have different sizes depending upon the embodiment, and in some embodiments can be sized to be sufficiently large so as to eliminate (or reduce) any momentary spike in the temperature of the water dispensed by the faucet when water flow is first switched on, but not too large that the water within the mixing/buffer chamber would lower (or significantly lower) the temperature of the water dispensed by the faucet to a temperature that is below (or substantially below) the desired output (or set) temperature.

Notwithstanding the above description, the present disclosure encompasses numerous additional embodiments and arrangements in addition to those described above, or differing in one or more respects from those described above. For example, although the water dispensation system 100 and sink system 102 thereof can be a water dispensation for implementation in a kitchen or bathroom as a kitchen sink system or bathroom sink system, the present disclosure is also intended to encompass water dispensation systems employed in a variety of different locations or circumstances including, for example, as a bath installation or shower installation.

Also for example, any of a variety of thermostatic mixing valves can be employed, any of a variety of sizes of hot water tanks can be employed, any of a variety of different types of solenoid valves or other valves can be employed to govern water flow, and/or any of a variety of sizes of mixing/buffer chambers can be employed, in different point-of-use water heating systems encompassed herein.

Further for example, the present disclosure also encompasses water dispensation systems and point-of-use water heating systems having additional features and capabilities in addition to those described above. Such additional features and capabilities can entail, for example, safety mechanisms intended to enhance safety (albeit it should be appreciated that the use of the term "safety" herein is not a representation that any system or method encompassed herein will make any environment, circumstance, or process safe, as safety in any environment, circumstance or process depends on a wide variety of factors outside the scope of the present disclosure). Also, such additional features and capabilities can be configured to provide, for example, performance monitoring, call service indications, or wireless (e.g., Bluetooth-enabled) control, monitoring, or communications. Further for example, one or more of the electrical connections described herein (e.g., between the faucet control 370 and the infrared sensor 118 of the faucet 104, or between the faucet control and the solenoid valve 316) can in some other embodiments be replaced with wireless connections.

It is specifically intended that the present invention not be limited to the embodiments and illustrations contained herein, but include modified forms of those embodiments including portions of the embodiments and combinations of elements of different embodiments as come within the scope of the following claims.

We claim:

1. A point-of-use water heating system comprising:
 a thermostatic mixing valve having first, second, third, and fourth ports, wherein the first port is configured to receive, at least indirectly, input water having an input water temperature;
 a hot water tank having a first inlet and a first outlet, wherein the first inlet is coupled at least indirectly to the second port of the thermostatic mixing valve, and wherein the first outlet is coupled at least indirectly to the third port of the thermostatic mixing valve, wherein the hot water tank is configured to heat a portion of the input water received from the thermostatic mixing valve to become heated water having an elevated temperature greater than the input water temperature;
 an actuatable valve having a second inlet and a second outlet, wherein the second inlet is coupled at least indirectly to the fourth port of the thermostatic mixing valve; and
 a buffering chamber having a third inlet and a third outlet, wherein the third inlet is coupled at least indirectly to the second outlet of the actuatable valve, and wherein the third outlet is configured to provide, at least indirectly, output water having a desired output temperature that is greater than the input water temperature and less than the elevated temperature,
 wherein the thermostatic mixing valve is configured to output, at the fourth port, mixed water including both a first portion of the input water and a second portion of the heated water, wherein the mixed water is communicated by the actuatable valve to be received by the buffering chamber, and wherein the buffering chamber is configured to retain a residual portion of the mixed water when the actuatable valve is switched to a closed status so that, when the actuatable valve is subsequently switched to an open status, a further amount of water communicated from the thermostatic mixing valve by the actuatable valve to be received by the buffering chamber undergoes a mixing with the residual portion,
 whereby, if the further amount of water has a further temperature greater than the desired output temperature due to a reaction time of the thermostatic mixing valve, then due to the mixing a combined water portion within the buffering chamber resulting from the mixing has a combined temperature that is less than the further temperature.

2. The point-of-use water heating system of claim 1, further comprising an input terminal and a first conduit at least indirectly linking the input terminal with the first port, wherein the input terminal is configured to be coupled at least indirectly to a water source so as to receive the input water from the water source.

3. The point-of-use water heating system of claim 2, further comprising a fitting and a water hammer arrestor, wherein input terminal is formed on or as a part of the fitting, wherein the first conduit at least indirectly with an additional port on the fitting, and wherein the water hammer arrestor is also coupled to the fitting.

4. The point-of-use water heating system of claim 2, further comprising a second conduit linking the second port with the first inlet of the hot water tank.

5. The point-of-use water heating system of claim 4, wherein the first inlet of the hot water tank is vertically lower than the first outlet of the hot water tank.

6. The point-of-use water heating system of claim 4, further comprising a third conduit linking the first outlet of the hot water tank with the third port.

7. The point-of-use water heating system of claim 6, further comprising a fourth conduit linking the fourth port with the second inlet of the actuatable valve.

8. The point-of-use water heating system of claim 1, wherein the actuatable valve is a solenoid valve that is coupled to receive a control signal and, based upon the control signal, can take on the open status or the closed status.

9. The point-of-use water heating system of claim 8, further comprising a housing within which are positioned each of, or substantially each of, the hot water tank, the solenoid valve, and the buffering chamber.

10. The point-of-use water heating system of claim 8, wherein the buffering chamber is a tubular structure supported at least indirectly upon the solenoid valve, wherein the third inlet is below the third outlet.

11. The point-of-use water heating system of claim 1, further comprising at least one electrical control component or a temperature and pressure relief valve coupled at least indirectly to the hot water tank.

12. A water dispensation system comprising the point-of-use water heating system of claim 8, and further comprising a sink system including a faucet, wherein the sink system includes an infrared sensor that is at least indirectly coupled to the solenoid valve so as to provide the control signal or a sensing signal upon which the control signal is at least indirectly based.

13. The water dispensation system of claim 12, wherein the sink system is configured to be implemented in a kitchen or a bathroom, wherein the point-of-use water heating system is configured to be positioned beneath a sink basin of the sink system.

14. A method of providing heated water comprising:
receiving input water having an input water temperature at a first port of a thermostatic mixing valve;
communicating a first portion of the input water from a second port of the thermostatic mixing valve to a first inlet of a hot water tank;
heating the first portion of the input water within the hot water tank to generate heated water having an elevated temperature that is greater than the input water temperature;
communicating a second portion of the heated water from the hot water tank to a third port of the thermostatic mixing valve;
mixing, at a thermostatic mixing valve, a third portion of the input water having the input water temperature with the second portion of the heated water having the elevated temperature, so as to generate mixed water having a desired output temperature;
receiving a control signal that causes an additional valve at least indirectly coupling a fourth port of the thermostatic mixing valve with a buffering device to have an open status, so that a fourth portion of the mixed water flows from the thermostatic mixing valve to the buffering device; and
outputting the fourth portion of the mixed water having the desired output temperature from the buffering device for receipt by a dispensation device.

15. The method of claim 14, further comprising:
causing the additional valve to have a closed status;
retaining a residual amount of the mixed water within the buffering device;
causing the additional valve to again have an open status, so that an additional water amount flows from the thermostatic mixing valve to the buffering device;
mixing the additional water amount with the residual amount of the mixed water within the buffering device to produce further water; and
outputting the further water from the buffering device to be received by the dispensation device.

16. The method of claim 15, wherein the additional water amount is either at the elevated temperature or an additional temperature that is less than the elevated temperature, and wherein the further water is at a further temperature that is less than the elevated temperature due to the mixing of the additional water amount with the residual amount of the mixed water.

17. The method of claim 16, further comprising:
causing a further water amount to flow from the thermostatic mixing valve to the buffering device and then out of the buffering device, the further water amount having the desired output temperature.

18. The method of claim 15,
wherein the additional valve is a solenoid valve;
wherein the control signal is received at least indirectly from, or based at least indirectly upon an additional signal from, a first infrared sensor associated with a faucet of a sink, and wherein the control signal occurs in response to the first infrared sensor sensing a presence of an object in proximity to the first infrared sensor; and
wherein the additional valve is caused to have a closed status when the control signal ceases or takes on a modified value in response to the first infrared sensor ceasing to sense the presence of the object in proximity to the first infrared sensor.

19. A water dispensation system comprising:
a sink system including a sink basin, a faucet, and a sensing device mounted at least indirectly in relation to the sink basin and the faucet;
a point-of-use water heating system positioned adjacent or in proximity to the sink system, the point-of-use water heating system including
a thermostatic mixing valve having first, second, third, and fourth ports, wherein the first port is configured to receive, at least indirectly, input water having an input water temperature,
a hot water tank having a first inlet and a first outlet, wherein the first inlet is coupled at least indirectly to the second port of the thermostatic mixing valve, and wherein the first outlet is coupled at least indirectly to the third port of the thermostatic mixing valve so as to allow for heated water to flow from the first outlet to the third port,
a solenoid valve having a second inlet and a second outlet, wherein the second inlet is coupled at least indirectly to the fourth port of the thermostatic mixing valve, and
a buffering chamber having a third inlet and a third outlet, wherein the third inlet is coupled at least indirectly to the second outlet of the solenoid valve, and wherein the buffering chamber is configured to provide via the third outlet, at least indirectly, output water having a desired output temperature that is greater than the input water temperature and less than an elevated temperature of the heated water; and a plurality of links at least indirectly coupling the point-of-use water heating system with each of the faucet and the sensing device of the sink system, wherein the third outlet is coupled at least indirectly to the faucet by a first link of the plurality of links so that the output water flows to and is dispensed by the faucet.

20. The water dispensation system of claim 19, wherein the hot water tank is configured to heat a portion of the input water received from the thermostatic mixing valve to become the heated water having the elevated temperature, which is greater than the input water temperature;

wherein the thermostatic mixing valve is configured to output, at the fourth port, mixed water including both a first portion of the input water and a second portion of the heated water, wherein the mixed water is communicated by the actuatable valve for receipt by the buffering chamber; and wherein the buffering chamber is configured to retain a residual portion of the mixed water when the solenoid valve is switched to a closed status so that, when the solenoid valve is subsequently switched to an open status, a further water amount communicated from the thermostatic mixing valve by the solenoid valve for receipt by the buffering chamber is mixed with the residual portion.

* * * * *